(12) United States Patent
Lee et al.

(10) Patent No.: US 10,993,172 B2
(45) Date of Patent: Apr. 27, 2021

(54) METHOD AND APPARATUS FOR PERFORMING ACCESS BARRING CHECK

(71) Applicant: LG Electronics Inc., Seoul (KR)

(72) Inventors: Youngdae Lee, Seoul (KR); Hyunjung Choe, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/252,435

(22) Filed: Jan. 18, 2019

(65) Prior Publication Data
US 2019/0159108 A1 May 23, 2019

Related U.S. Application Data

(63) Continuation of application No. PCT/KR2018/007142, filed on Jun. 25, 2018.
(Continued)

(51) Int. Cl.
*H04W 48/10* (2009.01)
*H04W 48/02* (2009.01)
(Continued)

(52) U.S. Cl.
CPC ............. *H04W 48/10* (2013.01); *H04W 8/08* (2013.01); *H04W 48/02* (2013.01); *H04W 48/12* (2013.01); *H04W 68/02* (2013.01); *H04W 76/27* (2018.02); *H04W 80/02* (2013.01); *H04W 48/16* (2013.01); *H04W 84/042* (2013.01)

(58) Field of Classification Search
CPC ..... H04W 48/10; H04W 76/27; H04W 68/02; H04W 80/02; H04W 48/02; H04W 48/16; H04W 8/08; H04W 84/042
See application file for complete search history.

(56) References Cited

U.S. PATENT DOCUMENTS

2013/0045706 A1    2/2013   Hsu
2015/0163662 A1    6/2015   Klatt
(Continued)

FOREIGN PATENT DOCUMENTS

KR    1020160021104    2/2016
KR    1020160128342    11/2016
(Continued)

OTHER PUBLICATIONS

LG Electronics Inc., "Access category based access barring for RRC_IDLE and RRC_INACTIVE", R2-1707138, 3GPP TSG-RAN WG2 NR AH#2, Qingdao, China, Jun. 27-29, 2017, 3 pages.
(Continued)

*Primary Examiner* — Jackie Zuniga Abad

(74) *Attorney, Agent, or Firm* — Fish & Richardson, P.C.

(57) ABSTRACT

Provided are a method for a user equipment (UE) to perform access barring check in a wireless communication system, and an apparatus supporting the same. The method may include: receiving a list of barring information, wherein each of the barring information includes a barring factor and a barring time; receiving information on an access category related to barring information included in the list; performing the access barring check for the access category, based on the barring information related to the access category; and performing uplink transmission, if an access attempt is allowed for the access category.

18 Claims, 16 Drawing Sheets

Related U.S. Application Data

(60) Provisional application No. 62/523,799, filed on Jun. 23, 2017, provisional application No. 62/523,786, filed on Jun. 23, 2017.

(51) Int. Cl.
  *H04W 8/08* (2009.01)
  *H04W 80/02* (2009.01)
  *H04W 68/02* (2009.01)
  *H04W 76/27* (2018.01)
  *H04W 48/12* (2009.01)
  *H04W 48/16* (2009.01)
  *H04W 84/04* (2009.01)

(56) References Cited

U.S. PATENT DOCUMENTS

| | | | |
|---|---|---|---|
| 2016/0212653 A1* | 7/2016 | Wang | A61B 10/0051 |
| 2017/0041854 A1 | 2/2017 | Kim et al. | |
| 2017/0048748 A1 | 2/2017 | Susitaival et al. | |

FOREIGN PATENT DOCUMENTS

| | | |
|---|---|---|
| KR | 1020160130405 | 11/2016 |
| WO | WO2013020778 | 2/2013 |
| WO | WO2013093192 | 6/2013 |
| WO | WO 2015/031202 | 3/2015 |
| WO | WO2017039565 | 3/2017 |

OTHER PUBLICATIONS

3rd Generation Partnership Project; Technical Specification Group Services and System Aspects; "Service accessibility (Release 15)", 3GPP TS 22.011 V15.1.0, dated Jun. 2017, 32 pages.

3rd Generation Partnership Project; Technical Specification Group Radio Access Network; "Evolved Universal Terrestrial Radio Access (E-UTRA); Radio Resource Control (ARC); Protocol specification (Release 14)", 3GPP TS 36.331 V14.2.2, dated Apr. 2017, 721 pages.

Extended European Search Report in European Application No. 18820926.6, dated Jun. 24, 2019, 10 pages.

Office Action in the Chilean Appln. No. 201900982, dated Apr. 21, 2020, 22 pages (with English translation).

Office Action in Singaporean Appln. No. 11201900399W, dated Jun. 16, 2020, 6 pages.

\* cited by examiner

METHOD AND APPARATUS FOR PERFORMING ACCESS BARRING CHECK

CROSS-REFERENCE TO RELATED APPLICATIONS

Pursuant to 35 U.S.C. § 119(e), this application is a continuation of International Application PCT/KR2018/007142, with an international filing date of Jun. 25, 2018, which claims the benefit of U.S. Provisional Patent Applications Nos. 62/523,799, filed on Jun. 23, 2017 and 62/523,786, filed on Jun. 23, 2017, the contents of which are hereby incorporated by reference herein in its entirety.

BACKGROUND OF THE INVENTION

Field of the Invention

The present invention relates to a wireless communication system, and more particularly, to a method for a user equipment (UE) to perform access barring check and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE INVENTION

Meanwhile, since access categories involve service type property, accesses belonging to a particular service shall be processed with higher priority than others. For example, accesses for emergency services shall have higher priority than that of normal services, or accesses for normal services may have higher priority than that of Internet of Things (IoT) data transmissions. Meanwhile, in the NR, 64 access categories are defined, and access baring check may be applied to 63 access categories. If access baring parameters is defined for each of the access categories, signaling of a network for transmission of the access baring parameters may increase. Therefore, access barring check mechanisms based on access barring information set need to be proposed.

One embodiment provides a method for performing, by a user equipment (UE), access barring check in a wireless communication system. The method may include: receiving a list of barring information, wherein each of the barring information includes a barring factor and a barring time; receiving information on an access category related to barring information included in the list; performing the access barring check for the access category, based on the barring information related to the access category; and performing uplink transmission, if an access attempt is allowed for the access category.

Another embodiment provides a user equipment (UE) performing access barring check in a wireless communication system. The UE may include: a memory; a transceiver; and a processor, connected to the memory and the transceiver, that: controls the transceiver to receive a list of barring information, wherein each of the barring information includes a barring factor and a barring time; controls the transceiver to receive information on an access category related to barring information included in the list; performs the access barring check for the access category, based on the barring information related to the access category; and performs uplink transmission, if an access attempt is allowed for the access category.

Signaling of a network for transmission of the barring information can be decreased.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi- Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A/5G. However, technical features of the present invention are not limited thereto.

Figure 1:
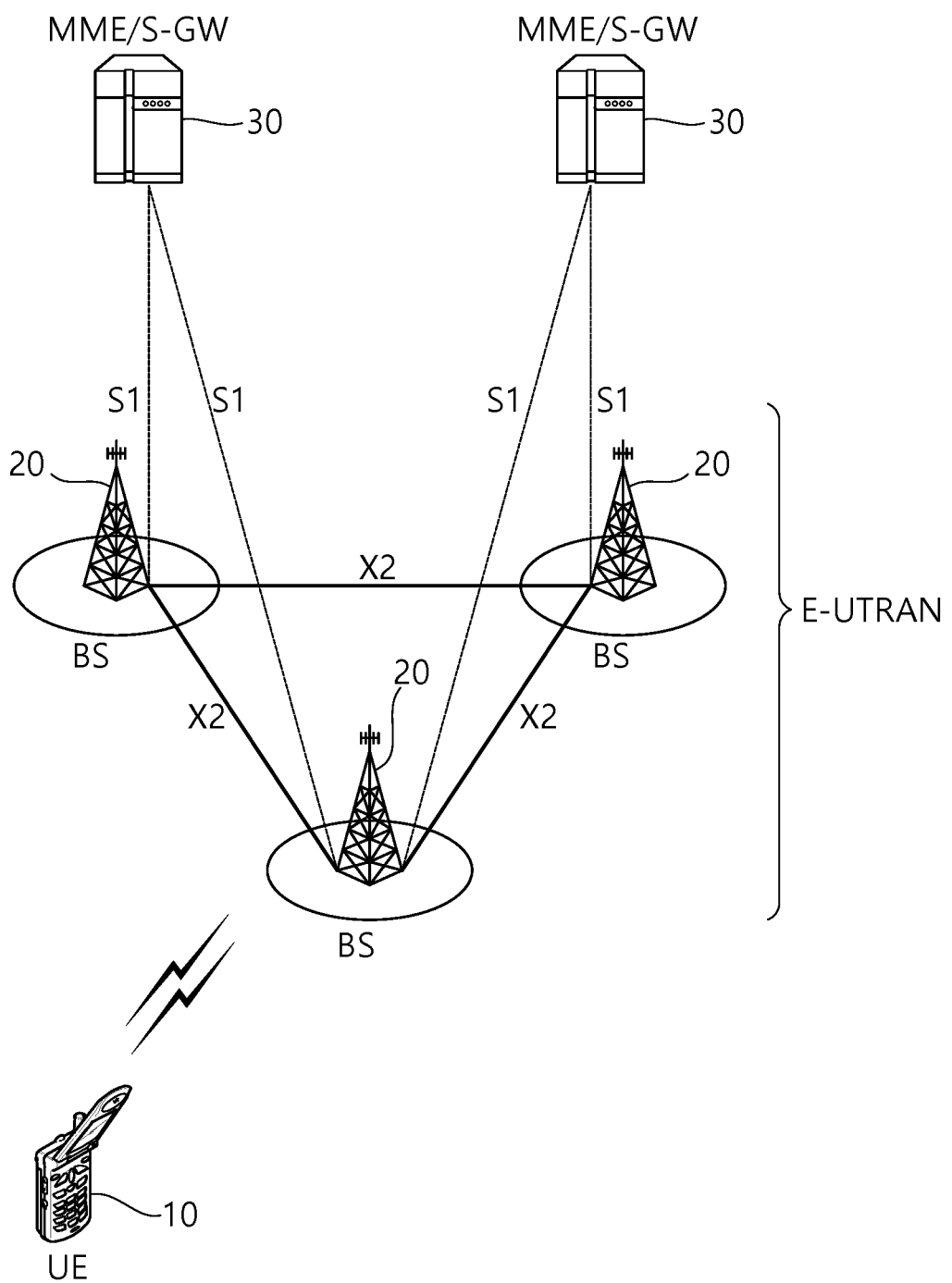
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
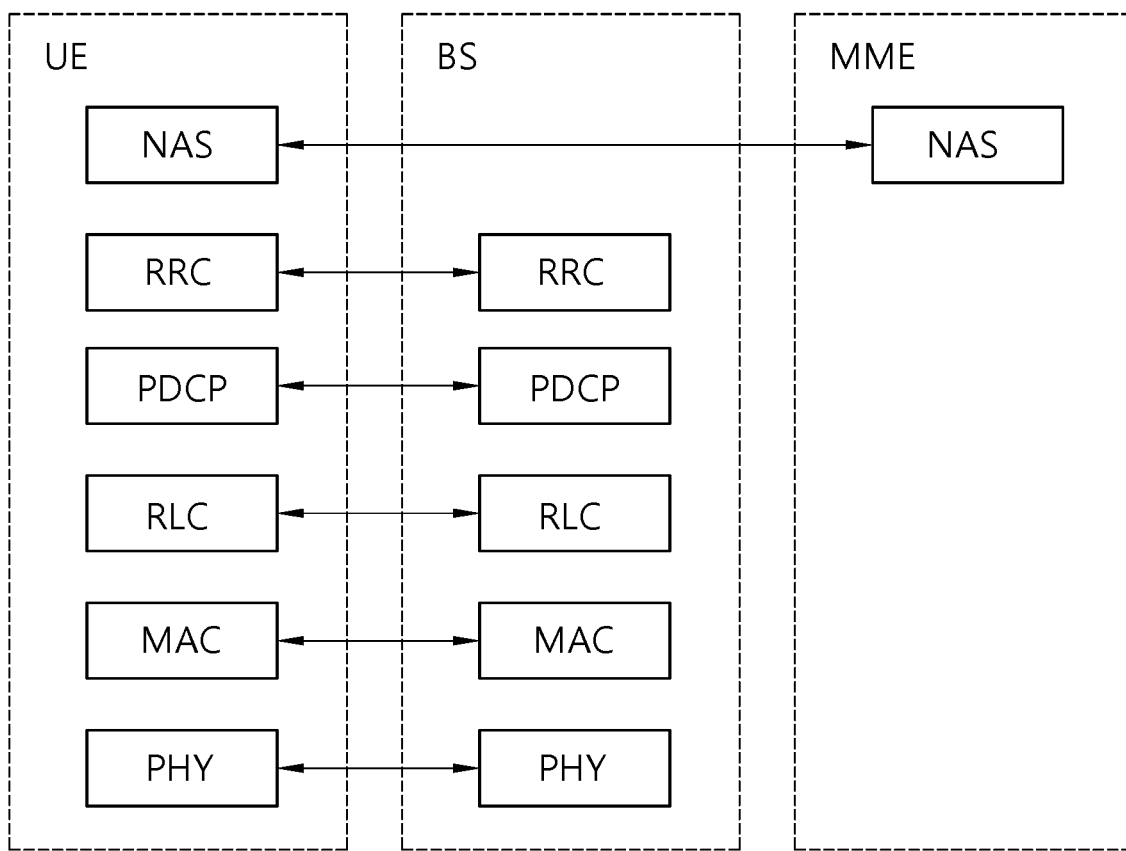
FIG. 2 shows a control plane of a radio interface protocol of an LTE system.
Figure 3:
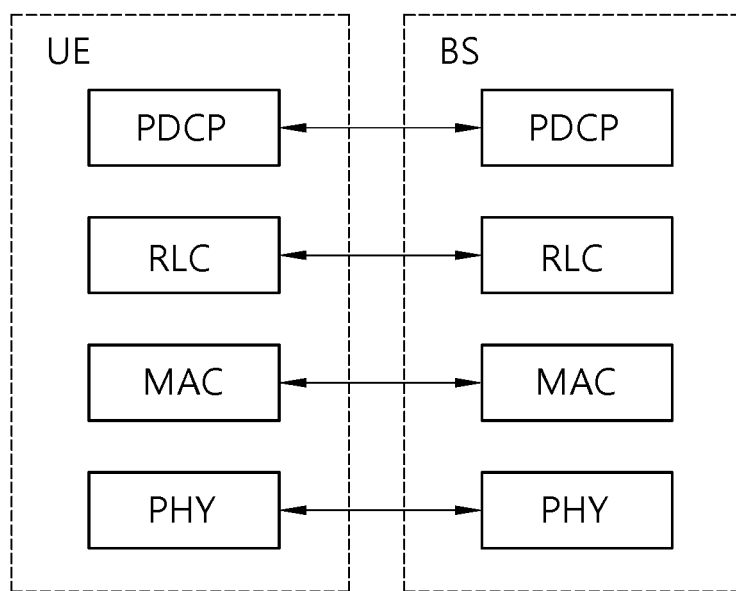
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
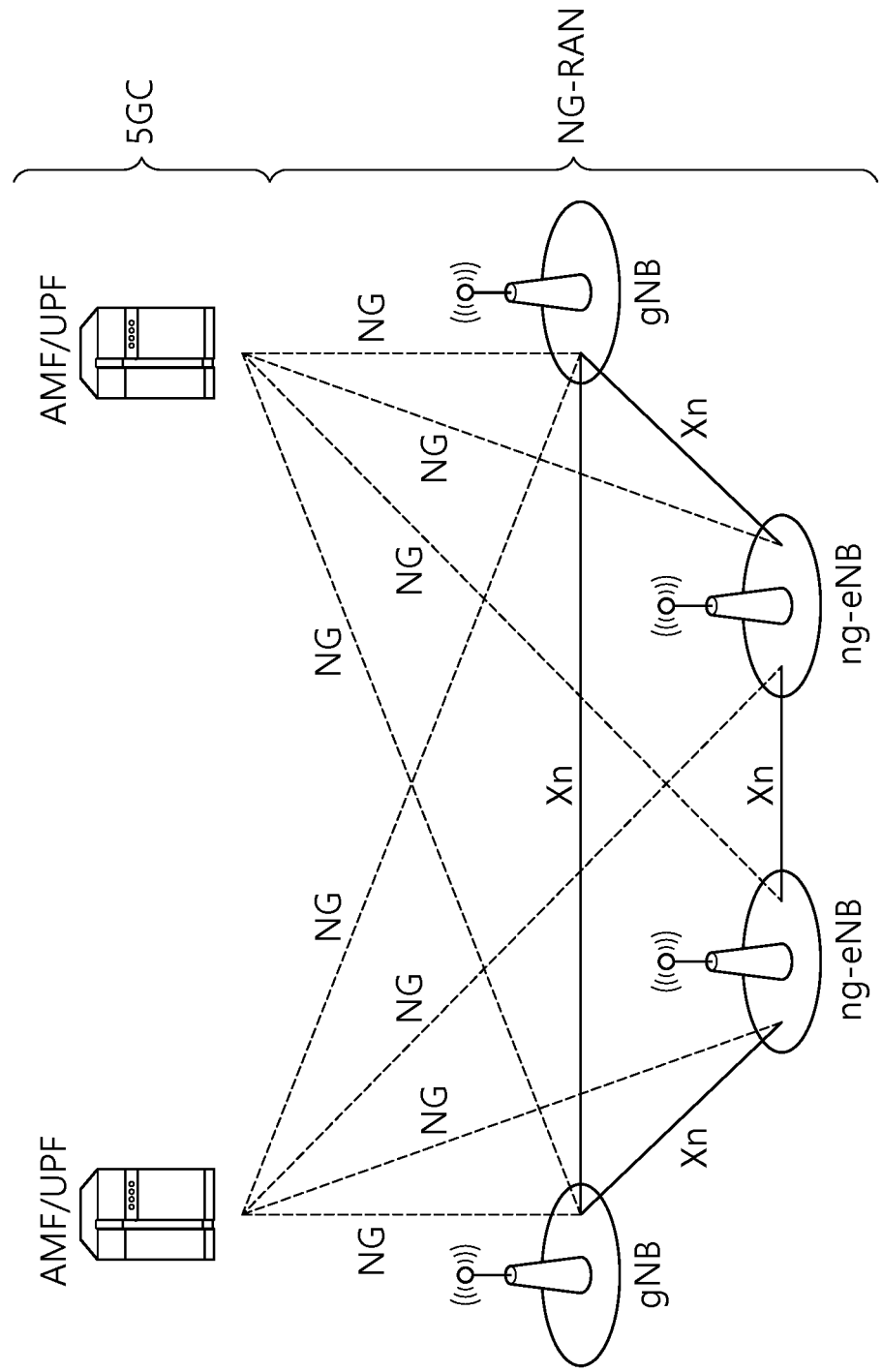
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and 5GC, and the NG-U may be user plane interface between NG-RAN and 5GC.

Figure 5:
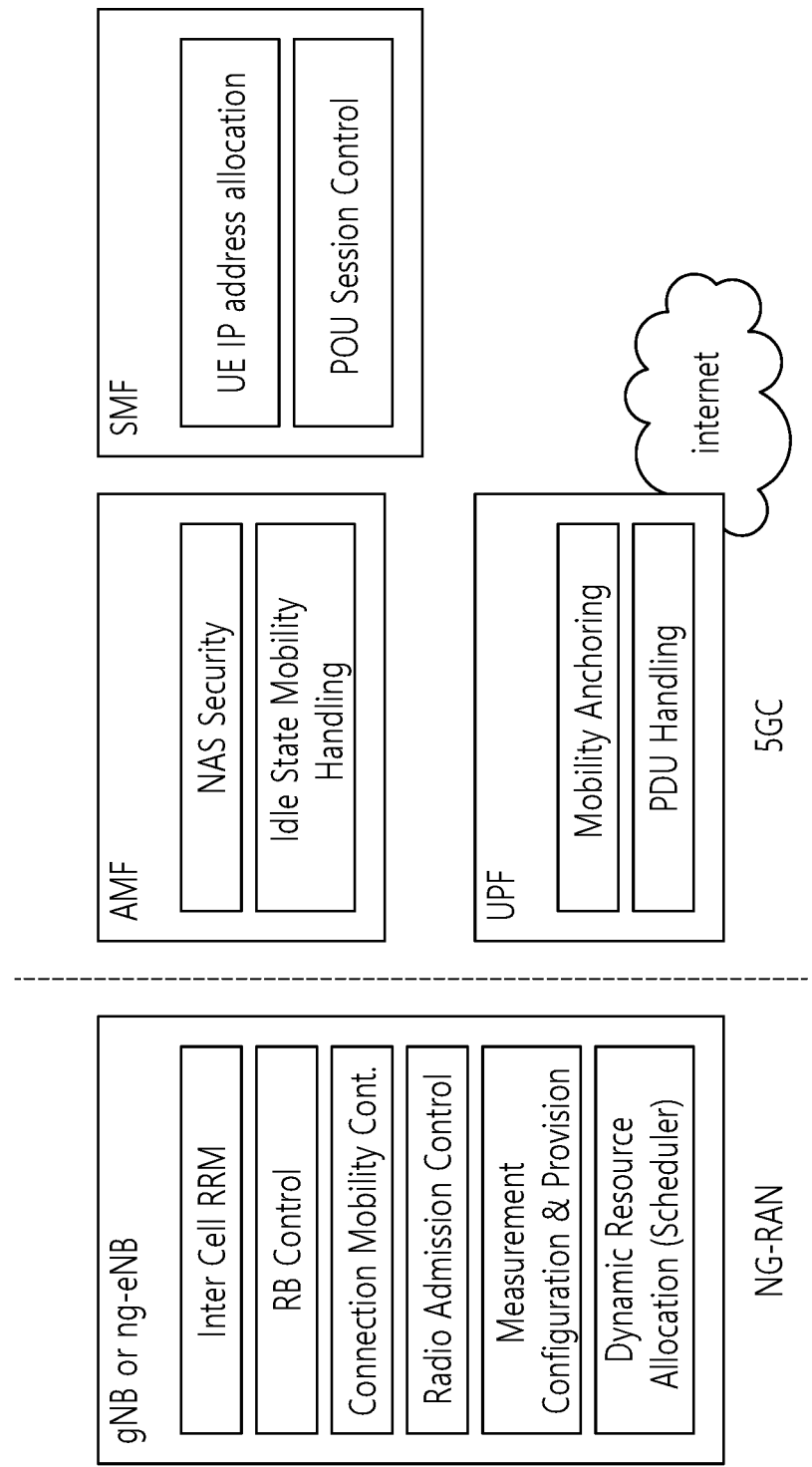
FIG. 5 shows functional split between NG-RAN and 5GC

FIG. 5 shows functional split between NG-RAN and 5GC

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or O&M);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) may host the following main functions:

NAS signalling termination;

NAS signalling security;

AS Security control;

Inter CN node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

SMF selection.

The User Plane Function (UPF) may host the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

The Session Management function (SMF) may host the following main functions:

Session Management;

UE IP address allocation and management;

Selection and control of UP function;

Configures traffic steering at UPF to route traffic to proper destination;

Control part of policy enforcement and QoS;

Downlink Data Notification.

Figure 6:
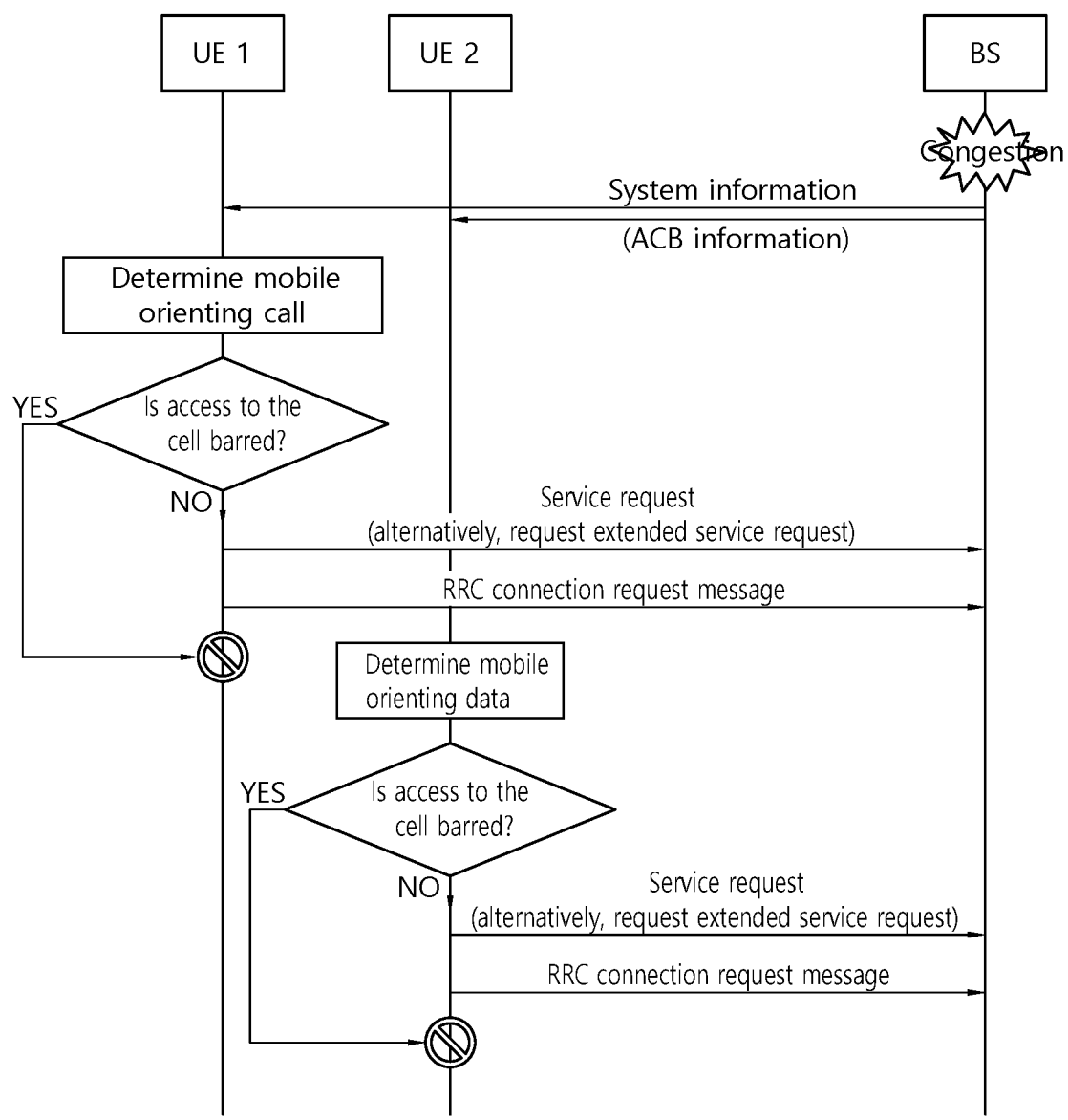
FIG. 6 shows an example of access barring check.

FIG. 6 shows an example of access barring check.

Referring to FIG. 6, in the overload or congest state of the network or the base station, the base station may broadcast access class barring (ACB)-related information through system information. The system information may be system information block (SIB) type 2.

The SIB type 1 may include ACB-related information like the following table.

TABLE 1

| Field | Description |
|---|---|
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 may determine an IMS service, for example, mobile orienting of a call by VoLTE and generates a service request message. Similarly, UE2 may determine mobile orienting of general data and generate the service request message.

Sequentially, the UE1 may generate an RRC connection request message. Similarly, the UE2 may generate the RRC connection request message.

Meanwhile, the UE1 may perform access barring check (that is, whether the ACB is applied). Similarly, the UE2 may perform access barring check (that is, whether the ACB is applied).

If the ACB is not applied, the UE1 and the UE2 may transmit the RRC connection request message, respectively. However, when the ACB is applied, both the UE1 and the UE2 may not transmit the RRC connection request message, respectively.

The access barring check will be described in detail as follows. Generally, at least one of 10 access classes (for example, AC0, AC1, . . . , and AC9) may be randomly allocated to the UE. Exceptionally, for urgent emergency access, AC10 is allocated. As such, the value of the randomly allocated access class may be stored in each USIM of the UE1 and the UE2. Then, the UE1 and the UE2 may verify whether the access barring is applied, by using a barring factor included in the received ACB-related information, based on the stored access class. The access barring check may be performed in each access stratum (AS) layer, that is, an RRC layer of the UE1 and the UE2.

The access barring check will be described in more detail as follows.

The ac-BarringPerPLMN-List may be included in the SIB type 2 received by each of the UE1 and the UE2, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 and the UE2 perform the RRC connection request, the access barring check may be performed by using T303 as Tbarring and using ac-BarringForMO-Data as a barring parameter.

When the barring is determined, each AS(RRC) layer of the UE1 and the UE2 may notify a failure of the RRC connection establishment to the higher layer.

Subsequently, as such, when the access is barred, each AS(RRC) layer may determine whether a T302 timer or a Tbarring timer is running. If the timer is not running, the T302 timer or the Tbarring timer may be run.

Meanwhile, while the T302 timer or a Tbarring timer is running, the AS(RRC) layer considers that all the access to the corresponding cell is barred.

As described above, in the network overload and congest situation, the base station may provide the ACB-related information to the UE. Then, the UE may check whether access to the cell is barred by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the base station.

Meanwhile, the access barring check may perform general mobile originating (MO) services of the UE, for example, originating call, originating data, originating IMS voice, and originating IMS video. That is, the ACB may be applied to access of all application programs (but, except for a response to an emergency service or paging).

As a method of differentiating a normal mobile originating (MO) service, for example, originating call, originating data, originating IMS voice, and originating IMS video, it is proposed application specific congestion control for data communication (ACDC).

Figure 7:
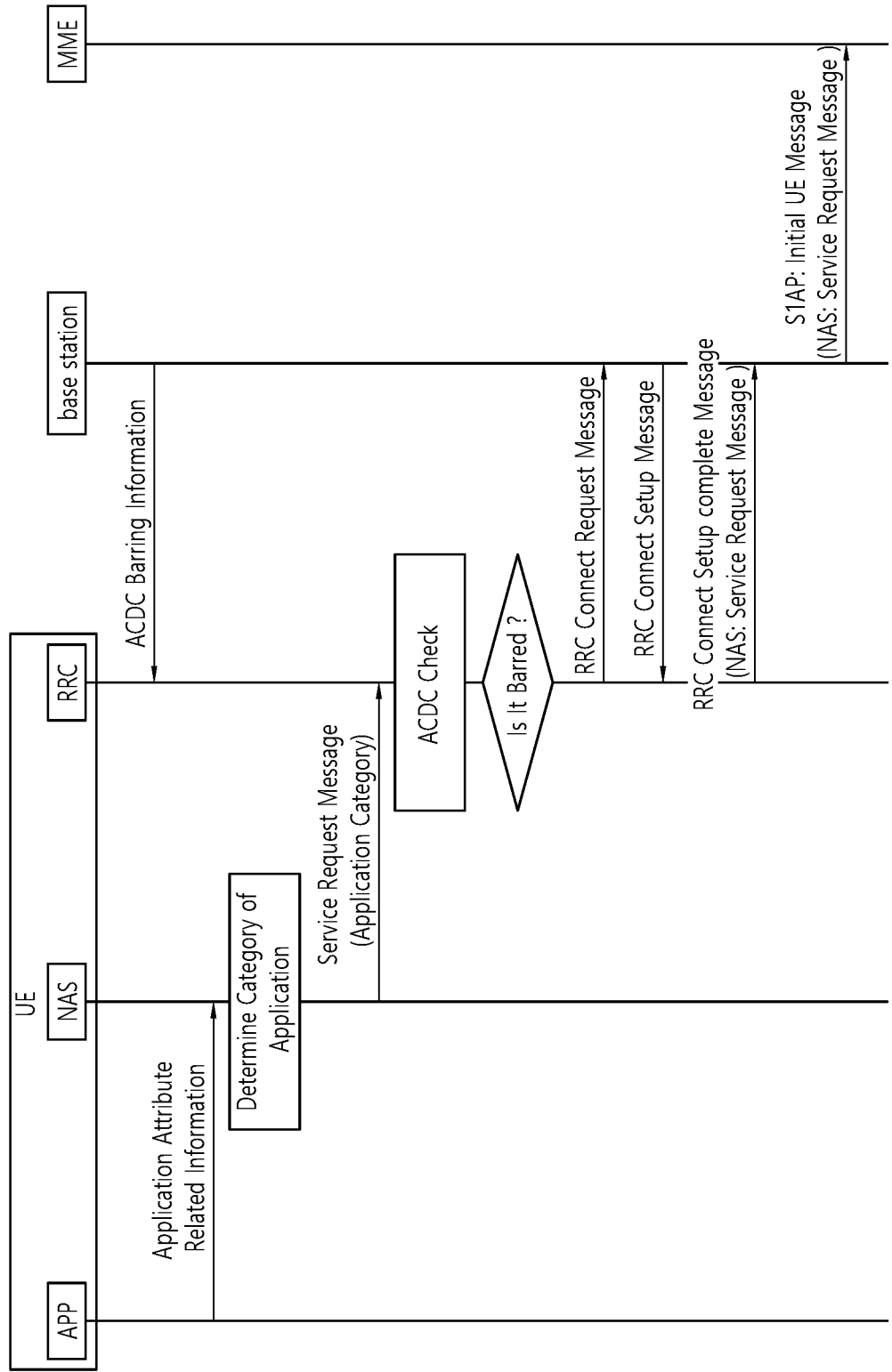
FIG. 7 shows an example of access barring check for Application specific Congestion control for Data Communication (ACDC).

FIG. 7 shows an example of access barring check for Application specific Congestion control for Data Communication (ACDC).

Referring to FIG. 7, firstly, a base station may provide ACDC barring information to a UE through SIB.

Meanwhile, when a specific application is executed in a UE and a data communication service is required by the specific application, an application layer for controlling execution of the specific application may provide application attribute related information to an NAS layer.

Then, on the basis of the application attribute related information received from the application layer, the NAS layer of the UE may determine an application category for the ACDC.

Subsequently, when starting a service request procedure for a service connection (transmission of a service request message or transmission of an extended service request message), the NAS layer of the UE may deliver information regarding the application category to an AS layer (i.e., RRC layer).

Before performing the service request procedure of the NAS layer (transmission of the service request message or transmission of an extended service request message), on the basis of the application category and ACDC barring information received from the network, the AS layer (e.g., RRC layer) of the UE may perform ACDC barring check and thus determines whether to allow or not allow the service request procedure.

If it is determined not to be barred but to be allowed as a result of the ACDC barring check, the AS layer (i.e., RRC layer) of the UE may transmit an RRC connection request message to the base station.

As described above, a service request required by an application currently being executed in the UE through the ACDC may be allowed or barred through differentiation.

Meanwhile, NG-RAN may support overload and access control functionality such as RACH back off, RRC Connection Reject, RRC Connection Release and UE based access barring mechanisms. One unified access control framework may be applied for NR. For each identified access attempt one Access Category and one or more Access Identities may be selected. NG-RAN may broadcast barring control information associated with Access Categories and Access Identities and the UE may determine whether an identified access attempt is authorized or not, based on the broadcasted barring information and the selected Access Category and Access Identities. In the case of multiple core networks sharing the same NG-RAN, the NG-RAN provides broadcasted barring control information for each PLMN individually. The unified access control framework may be applicable to all UE states. The UE states may include RRC_IDLE, RRC_INACTIVE or RRC_CONNECTED state. In RRC_IDLE, the UE NAS informs RRC of the access category and the Connection Request includes some information to enable the gNB to decide whether to reject the request.

Based on operator's policy, the 5G system shall be able to prevent UEs from accessing the network using relevant barring parameters that vary depending on Access Identity and Access Category. Access Identities are configured at the UE as listed in Table 2. Any number of these Access Identities may be barred at any one time.

TABLE 2

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |

TABLE 2-continued

| Access Identity number | UE configuration |
| --- | --- |
| 14 (NOTE 3) | Access Class 14 is configured in the UE. |
| 15 (NOTE 3) | Access Class 15 is configured in the UE. |

(NOTE 1): Access Identity 1 is used by UEs configured for MPS, in the PLMNs where the configuration is valid. The PLMNs where the configuration is valid are HPLMN, PLMNs equivalent to HPLMN, visited PLMNs of the home country, and configured visited PLMNs outside the home country.
(NOTE 2): Access Identity 2 is used by UEs configured for MCS, in the PLMNs where the configuration is valid. The PLMNs where the configuration is valid are HPLMN or PLMNs equivalent to HPLMN.
(NOTE 3): Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

Access Categories are defined by the combination of conditions related to UE and the type of access attempt as listed in Table 3. Access Category 0 shall not be barred, irrespective of Access Identities. The network can control the amount of access attempts relating to Access Category 0 by controlling whether to send paging or not.

TABLE 3

| Access Category number | Conditions related to UE | Type of access attempt |
| --- | --- | --- |
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8-31 | | Reserved standardized Access Categories |
| 32-63 (NOTE 2) | All | Based on operator classification |

(NOTE 1): The barring parameter for Access Category 1 is accompanied with information that define whether Access Category applies to UEs within one of the following categories:
a) UEs that are configured for delay tolerant service; b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
(NOTE 2): When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
(NOTE 3): Includes Real-Time Text (RTT).
(NOTE 4): Includes IMS Messaging.

One or more Access Identities and only one Access Category are selected and tested for an access attempt. The 5G network shall be able to broadcast barring control information (i.e. a list of barring parameters associated with an Access Identity and an Access Category) in one or more areas of the RAN. The UE shall be able to determine whether or not a particular new access attempt is allowed based on barring parameters that the UE receives from the broadcast barring control information and the configuration in the UE. In the case of multiple core networks sharing the same RAN, the RAN shall be able to apply access control for the different core networks individually. The unified access control framework shall be applicable both to UEs accessing the 5G CN using E-UTRA and to UEs accessing the 5G CN using NR.

Since access categories involve service type property, accesses belonging to a particular service shall be processed with higher priority than others. For example, accesses for emergency services shall have higher priority than that of normal services, or accesses for normal services may have higher priority than that of Internet of Things (IoT) data transmissions. Meanwhile, in the NR, 64 access categories are defined, and access barring check may be applied to 63 access categories. If access barring parameters is defined for each of the access categories, signaling of a network for transmission of the access barring parameters may increase. Therefore, access barring check mechanisms based on access barring information set need to be proposed. Hereinafter, a method for a UE to perform access barring check based on access barring information set and an apparatus supporting the same according to an embodiment of the present invention are described in detail.

According to an embodiment of the present invention, one or more access categories can be mapped to a particular access priority, and then a UE may perform access barring mechanisms based on the access priority. In the present invention, the access priority can be referred to as priority, barring priority, access barring information, barring information, access barring configuration or barring configuration.

Figure 8:
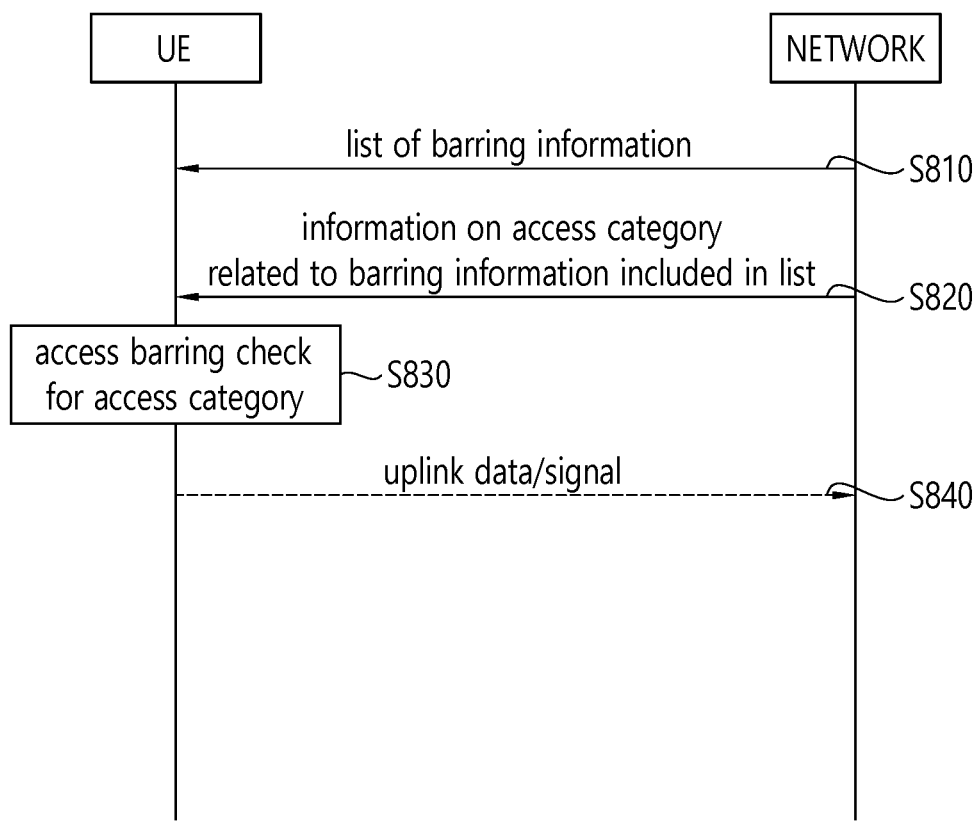
FIG. 8 shows an access control procedure based on access barring information mapped to an access category, according to an embodiment of the present invention.

FIG. 8 shows an access control procedure based on access barring information mapped to an access category, according to an embodiment of the present invention.

Referring to FIG. 8, in step S810, the UE may receive a list of barring information from a network. The list of barring information may be received from a base station via system information. For example, the system information may be system information block 1 or 2. The barring information may include certain barring factor and certain barring time. Table 4 shows an example of the list of barring information.

TABLE 4

| | Barring Factor | Barring Time |
| --- | --- | --- |
| barring information #0 | p05 | s16 |
| barring information #1 | p20 | s32 |
| barring information #2 | p55 | s64 |
| barring information #3 | P85 | s128 |

Referring to table 4, the list of barring information may include barring information #0 to barring information #3, and each of the barring information may include certain barring factor and certain barring time.

Table 5 shows an example of the list of barring information. In table 5, the list of barring information may be referred to as BarringPerPriority.

TABLE 5

```
BarringPerPriority ::= SEQUENCE (SIZE (1..maxPriority)) OF BarringPerPriority
BarringPerPriority ::= SEQUENCE {
    barringPriority#1      AC-BarringConfig      OPTIONAL,    -- Need OP,
    barringPriority#2      AC-BarringConfig      OPTIONAL,    -- Need OP,
}
    OPTIONAL   -- Need OP
}
AC-BarringConfig ::=  SEQUENCE {
    ac-BarringFactor        ENUMERATED {p00, p05, p10, p15, p20, p25, p30, p40, p50,
p60, p70, p75, p80, p85, p90, p95},
    ac-BarringTime   ENUMERATED {s4, s8, s16, s32, s64, s128, s256, s512},
    ac-BarringForSpecialAC       BIT STRING (SIZE(5))
}
```

Referring to table 5, the BarringPerPriority may include barringPriority #1 and barringPriority #2, and each of the barringPriority may include certain ac-BarringFactor and certain ac-BarringTime.

Table 6 shows another example of the list of barring information. In table 6, the list of barring information may be referred to as UAC-BarringInfoSetList, and the barring information may be referred to as UAC-BarringInfoSet.

TABLE 6

```
UAC-BarringPerCatList   ::=   SEQUENCE   (SIZE  (1..maxAccessCat-1))   OF   UAC-
BarringPerCat
UAC-BarringPerCat ::= SEQUENCE {
       AccessCategory  INTEGER (1..maxAccessCat-1),
       uac-barringInfoSetIndex   INTEGER (1.. maxBarringInfoSet)
}
UAC-BarringInfoSetList ::= SEQUENCE (maxBarringInfoSet) OF UAC-BarringInfoSet
UAC-BarringInfoSet ::= SEQUENCE {
    uac-BarringFactor   ENUMERATED {p00, p05, p10, p15, p20, p25, p30, p40,
p50, p60, p70, p75, p80, p85, p90, p95},
       uac-BarringTime   ENUMERATED {s4, s8, s16, s32, s64, s128, s256, s512},
       uac-BarringForAccessIdentity   BIT STRING (SIZE(7))
}
```

Referring to table 6, the UAC-BarringInfoSetList may include one or more UAC-BarringInfoSet, and each of the UAC-BarringInfoSet may include uac-BarringFactor and uac-BarringTime.

In step S820, the UE may receive mapping information between an access category and certain barring information included in the list. Referring to table 6, the UAC-Barring-PerCat may include the AccessCategory and the uac-barringInfoSetIndex, and the uac-barringInfoSetIndex is an index of the entry in field uac-BarringInfoSetList. For instance, value 1 corresponds to the first entry in uac-BarringInfoSetList, value 2 corresponds to the second entry in this list and so on. Namely, the uac-barringInfoSetIndex may indicate certain barring information mapped to the AccessCategory, among the list of barring information.

A mapping relationship between access categories and barring information will be described in detail with reference to FIG. 9.

Figure 9:
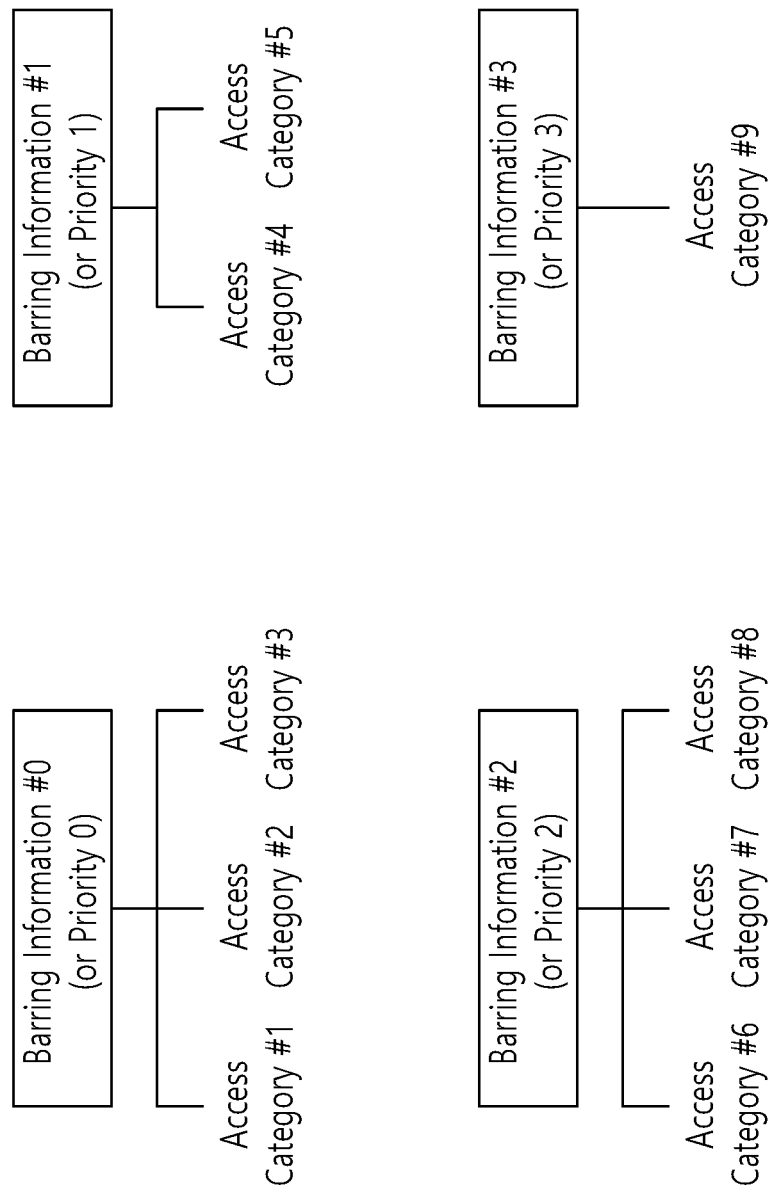
FIG. 9 shows an example of a mapping relationship between at least one access category and barring information, according to an embodiment of the present invention.

FIG. 9 shows an example of a mapping relationship between at least one access category and barring information, according to an embodiment of the present invention.

Referring to FIG. 9, the barring information #0 may be mapped to access category #1, access category #2 and access category #3. The barring information #1 may be mapped to access category #4 and access category #5. The barring information #2 may be mapped to access category #6, access category #7 and access category #8. The barring information #3 may be mapped to access category #9. That is, one barring information may be mapped to at least one access category.

Table 7 shows another example of a mapping relationship between at least one access category and a priority (i.e. the barring information).

TABLE 7

| Priority | Access category |
|---|---|
| 0 | AC#1, AC#2 (e.g. emergency service, operator services) |
| 1 | ... |
| ... | ... |
| Default | All ACs except the ones configured for the other priorities |
| P | AC#N (e.g. Delay tolerant services) |

Returning back to FIG. 8, in step S820, the network may provide the UE with part of mapping relationship between at least one access category and barring information. The network may provide the UE with a certain access category, and further the network may inform the UE which barring information is mapped to the certain access category. For example, the network may provide the UE with the access category #3 and indication indicating barring information #0.

Alternatively, in step S820, the network may provide the UE with all mapping relationship between at least one access category and barring information.

In step S830, the UE may perform access barring check for certain access category, based on the certain barring information mapped to the certain access category. For this, the UE may select the certain barring information corresponding to the certain access category, and then determine whether or not access to a cell is barred based on the selected certain barring information. The certain access category may be transmitted from a non-access stratum (NAS) layer of the UE to a radio resource control (RRC) layer of the UE. If the UE NAS transmits certain access category to the UE RRC, and if the UE RRC has certain barring information mapped to the certain access category, the UE RRC may perform access barring check for the certain access category, based on the certain barring information mapped to the certain access category.

In step S840, the UE may perform uplink transmission to the cell if an access attempt is allowed for the access category. Otherwise, the UE may start a timer if the access attempt is barred for the access category.

According to an embodiment of the present invention, one or more access categories can be mapped to a particular barring information, and then a UE may perform access barring mechanisms based on the barring information mapped to at least one access category. Therefore, compared to the case where access barring parameters is defined for each of the access categories, signaling of a network for transmission of the access barring parameters can be decreased.

Figure 10:
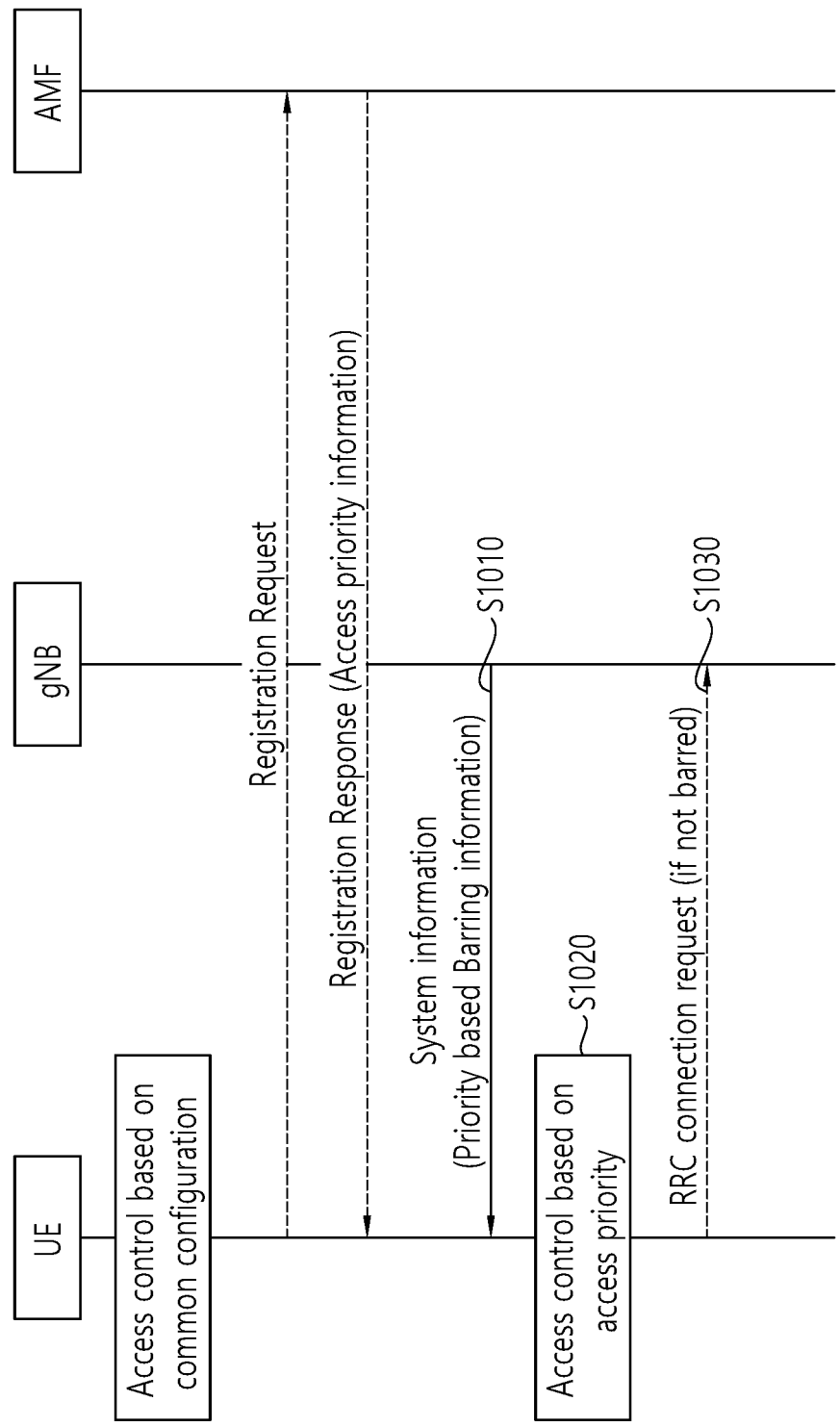
FIG. 10 shows an access control procedure based on access barring information mapped to an access category, according to an embodiment of the present invention.

FIG. 10 shows an access control procedure based on access barring information mapped to an access category, according to an embodiment of the present invention.

UEs may perform access barring check based on access priorities. After receiving broadcast indication including access barring elements for a priority, the UE determines whether access to a cell is allowed or not based on the priority based access barring information.

Referring to FIG. 10, in step S1010, the UE may receive a barring information element for each priority. The list of barring information elements is received via system information. For example, the system information may be SIB1 or SIB2. Then, the UE may select barring information for a priority corresponding to the particular access category. The priority and access category are indicated by the NAS layer of the UE. Alternatively, the priority is informed by the network, and the access category is indicated by the NAS layer of the UE.

One or more access categories may compose an access priority as illustrated in FIG. 9. The priority definition may be pre-configured or informed by the network. For example, the priority definition may be informed during Registration. For initial registration, the UE may not know the access priority unless the operator has provided pre-configured access priority information, e.g. in universal integrated circuit card (UICC). The UE will receive access priority information upon reception of Registration Accept. The UE NAS layer may maintain the information and deliver to the UE RRC layer when it submits a request.

Referring to table 7, access priorities may be composed of standardized priorities and operator-configured priorities. Also, Default access priority may be defined for the access where any priority has not been assigned. Default priority may not need to set as the lowest priority because some accesses will be defined for delay tolerant services and the priority should be the lowest.

In step S1020, the UE may determine whether or not access to a cell is barred based on the selected barring information. For example, the UE RRC layer may determine whether access to a cell is allowed or not based on priority included in the NAS request and access barring information broadcasted from the network.

In step S1030, the UE may perform uplink transmission to the cell if an access attempt is allowed for the access category. Otherwise, the UE may start a timer if the access attempt is barred for the access category.

Meanwhile, network slicing is supported in 5G for network functions optimizations. The network operator may deploy different network slice instances for different groups of services. Each PDU session can be dedicated to a particular network slice. Based on this, the network can provide differentiated services to customers. To support a particular service, the network operator may need to assign several network slices. For example, normal IMS services may require around three PDU sessions, mapping to three network slices, as they use three EPS bearers in 4G; one for signaling transmissions, another for voice call, and the other for video call. In other words, three network slices will be assigned to IMS services. Therefore, for the network to precisely control traffic from a particular service, the control shall be applied to several network slices which are assigned to the service. In 5G system, access barring mechanisms will be performed based on access categories. As access categories also involve service type in definition, network slicing and access categories have a relationship between them. In other words, access barring can be performed based on network slices.

According to an embodiment of the present invention, the UE may perform access barring check using network slice group based barring configuration. The barring configuration may be based on the mapping of network slice group and access categories. Each network slice group may map to one or more access categories. The mapping may be either decided by the UE itself or provided by the network operator.

Figure 11:
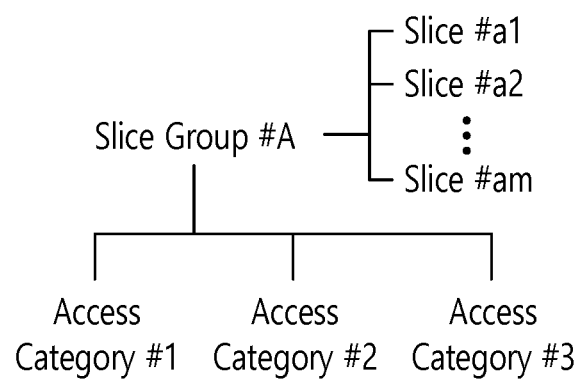
FIG. 11 shows an example of network slice group, according to an embodiment of the present invention.

The network slice group may be defined as illustrated in FIG. 11. One or more network slices may compose a network slice group. Each slice group may be mapping to one or more access categories where an access barring factor can be assigned to each access category. If the PLMN that the UE is registered to supports network slicing and the UE has pre-configured slicing information, the UE may use the configured group information. Or, the information may be delivered via Registration Accept message.

Figure 12:
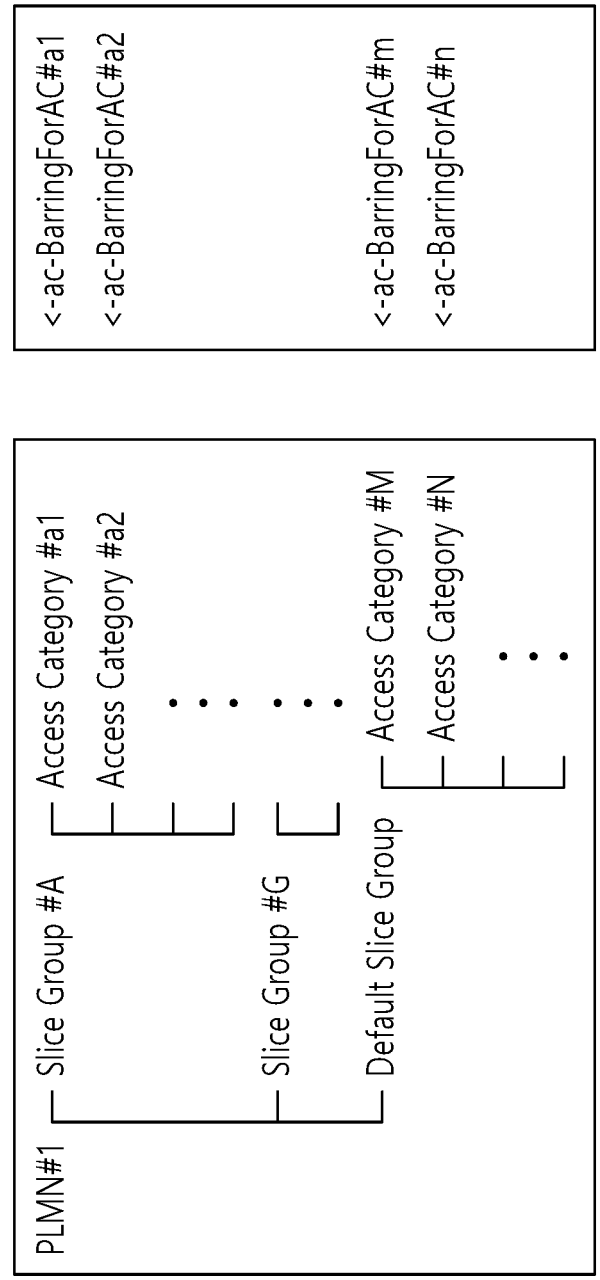
FIG. 12 shows an example of slice group based access barring configuration, according to an embodiment of the present invention.
Figure 13:
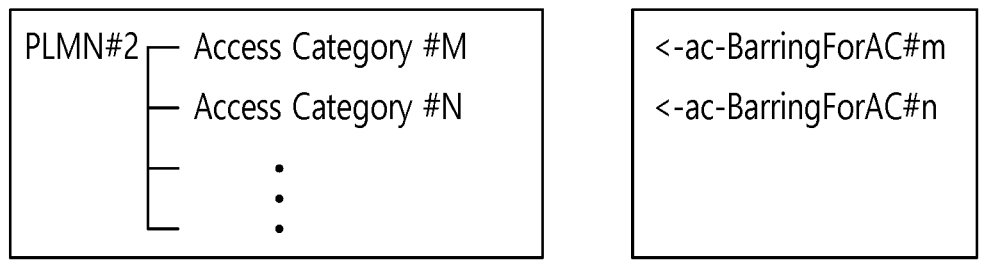
FIG. 13 shows an example of common access barring configuration, according to an embodiment of the present invention.

During the initial registration, the UE may not know network slice group information. The network will inform the group information when it sends Registration Accept to the UE. The group information may be maintained in the UE NAS layer and delivered to the UE RRC layer when the UE requests connection establishment. The network slice group information may include Default Slice Group as presented in FIG. 12. When none of slice group can be applied in the UE, the UE will use Default Slice Group. The gNB may send access barring information based on the slice groups. If even Default Slice Group is not available, the UE may perform common barring check based on only access categories as presented in FIG. 13. Since network slicing is an optional feature, the UEs registered to PLMNs which do not support network slicing, of course, may perform common barring check.

Figure 14:
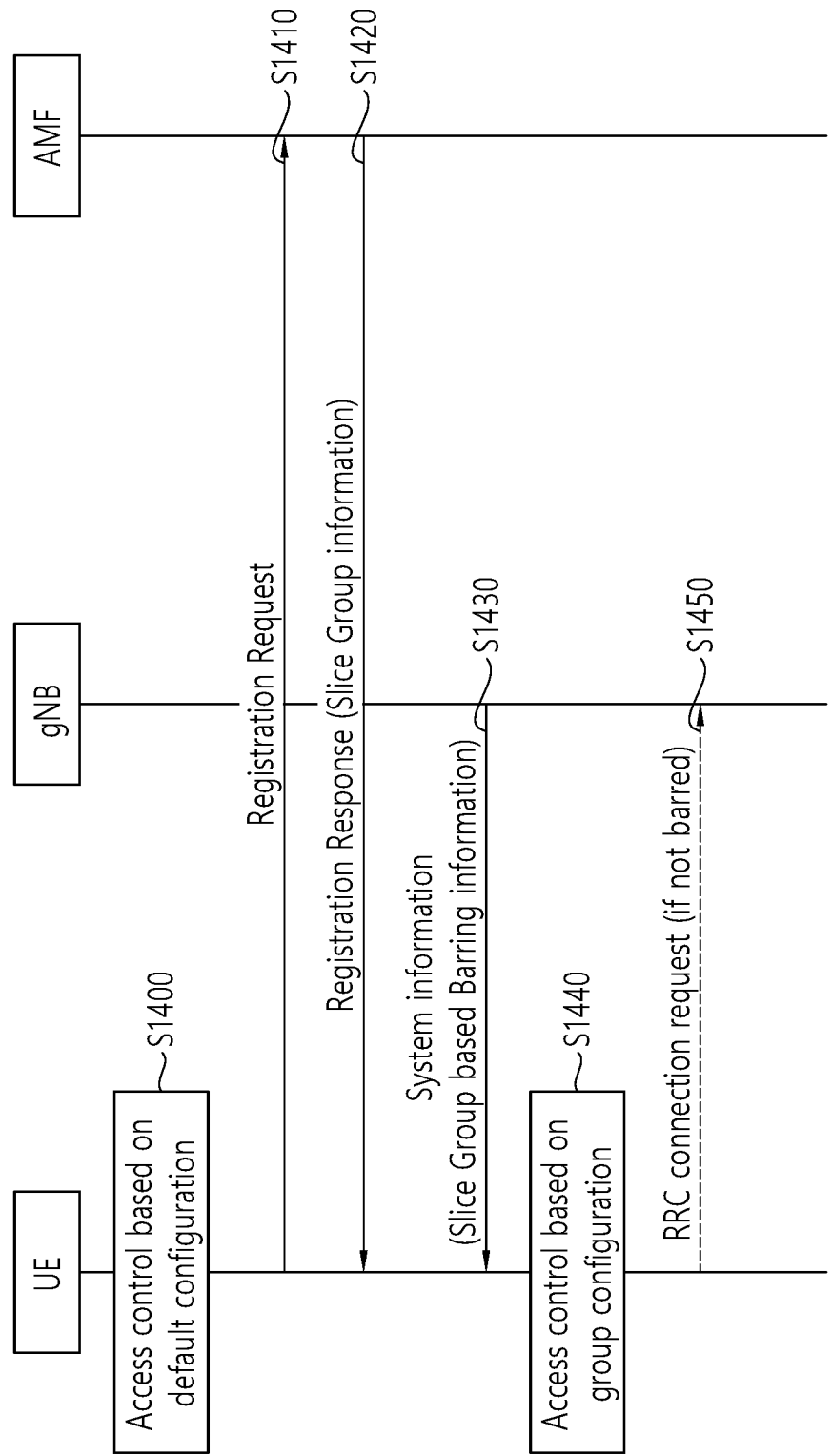
FIG. 14 shows an access barring mechanism based on network slice group, according to an embodiment of the present invention.

FIG. 14 shows an access barring mechanism based on network slice group, according to an embodiment of the present invention.

Referring to FIG. 14, initial registration procedures include step S1400 to S1420, and procedures after successful registration include step S1430 to S1450.

In step S1400, the UE may receive access barring information via broadcast indication (e.g. SystemInformationBlock1 or 2) from the gNB. If the PLMN defines Default Slice Group for access control, the broadcast indication may include barring information for the group. Alternatively, fi the PLMN does not define Default Slice Group or not support network slicing, the broadcast indication may include common access barring information. The broadcast indication message (e.g. SystemInformationBlock1 or 2) can provide barring information based on slice groups as table 8.

TABLE 8

```
SystemInformationBlockType2 ::=   SEQUENCE {
    ac-BarringInfoSliceGroup#1           SEQUENCE {
        ac-BarringForAccessCategory#1    BOOLEAN,
        ac-BarringForAccessCategory#2    AC-BarringConfig    OPTIONAL,
    -- Need OP
    }
    ac-BarringInfoSliceGroup#2           SEQUENCE {
        ac-BarringForAccessCategory#5    AC-BarringConfig    OPTIONAL,
    -- Need OP
    }
    ac-BarringInfoDefaultSliceGroup      SEQUENCE {
        ac-BarringForAccessCategory#3    AC-BarringConfig    OPTIONAL,
    -- Need OP
        ac-BarringForAccessCategory#4    AC-BarringConfig    OPTIONAL,
    -- Need OP
    }
```

When the UE requests Registration, the UE NAS layer may inform necessary information for connection establishment to the UE RRC layer. If the UE has pre-configured Default Slice Group, the UE NAS layer may inform of the slice, if available, and optionally access category information (e.g. sliceGroupId, accessCategoryId) to the UE RRC layer. Alternatively, if the UE has no slice information, the UE NAS layer may inform of access category to the UE RRC layer.

The UE RRC layer may select barring information and determine whether access to a cell is barred or not.

In step S1410, the UE may transmit Registration Request if not barred.

In step S1420, the UE may receive Registration Accept with Slice Group Information and update the group information for the registered PLMN. The Slice Group Information may include a slice group identifier (e.g. sliceGroupId) and the associated access category lists.

In step S1430, the UE may receive access barring information based on network slice group via broadcast indication (e.g. SystemInformationBlock1 or 2). The broadcast indication message (e.g. SystemInformationBlock1 or 2) can provide barring information based on slice groups as table 8. Then, the UE may update access barring information for the PLMN. During RRC connection establishment, the UE RRC layer may select barring information for the network slice group corresponding to the particular access category.

Then, in step S1440, the UE may determine whether access to a cell is barred or not.

In step S1450, the UE sends RRC connection request to the network if an access attempt is allowed for the access category. Otherwise, the UE may start a timer if the access attempt is barred for the access category.

According to an embodiment of the present invention, the UE may receive a barring information element for each network slice group. The list of barring information elements is received via system information. Then, the UE may select barring information for a network slice group corresponding to the particular access category. The slice group may be indicated by the NAS layer of the UE. Then, the UE may determine whether or not access to a cell is barred based on the selected barring information.

Figure 15:
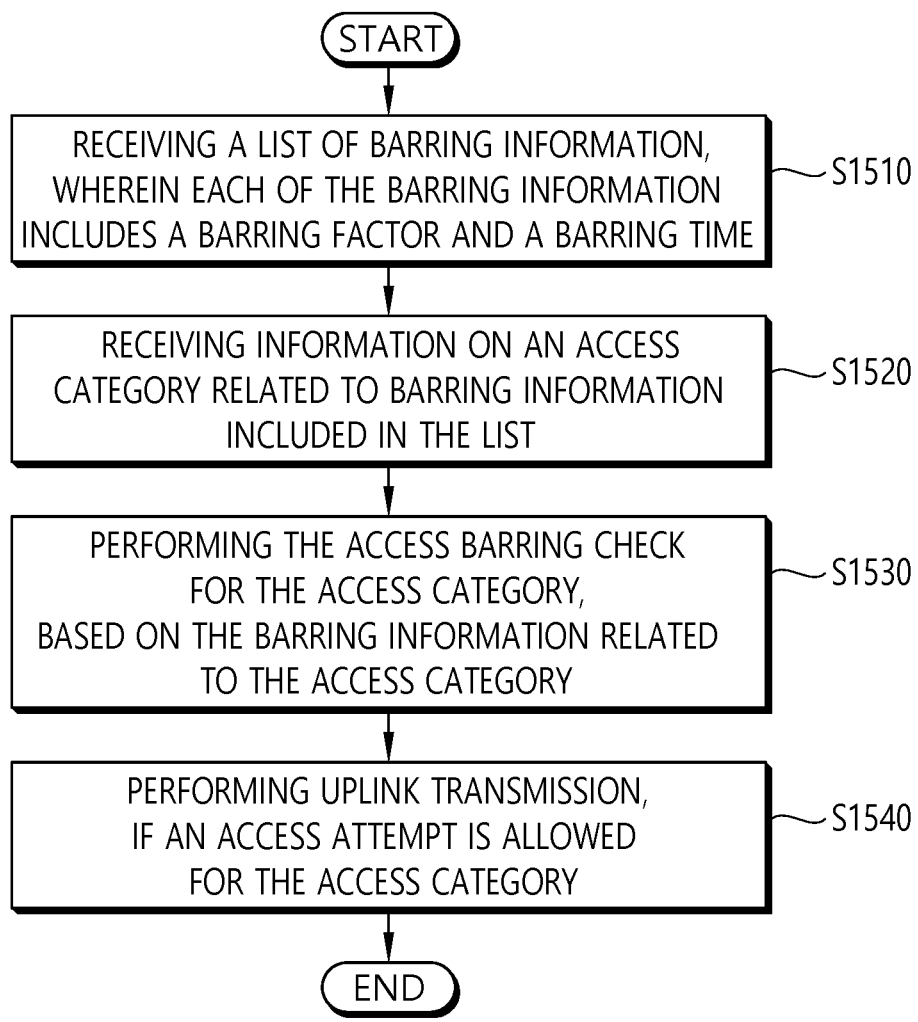
FIG. 15 is a block diagram illustrating a method for a UE to perform access barring check according to an embodiment of the present invention.

FIG. 15 is a block diagram illustrating a method for a UE to perform access barring check according to an embodiment of the present invention.

Referring to FIG. 15, in step S1510, the UE may receive a list of barring information. Each of the barring information may include certain barring factor and certain barring time.

The list of barring information may be received from a network. The list of barring information may be received via system information.

In step S1520, the UE may receive information on an access category related to certain barring information included in the list. For instance, the information may be mapping information between the access category and the certain barring information included in the list. The certain barring information included in the list may be related to one or more access categories. The mapping information may be received from a network.

In step S1530, the UE may perform the access barring check for the access category, based on the certain barring information related to the access category.

The access barring check for the access category may be performed based on the certain barring information related to the access category, if the access category is included in the one or more access categories.

The access category may be transmitted from a non-access stratum (NAS) layer of the UE to a radio resource control (RRC) layer of the UE. The access barring check for the access category may be performed based on the certain barring information related to the access category, if the access category is transmitted from the NAS layer of the UE to the RRC layer of the UE.

In step S1540, the UE may perform uplink transmission, if an access attempt is allowed for the access category. The uplink transmission includes transmission of a radio resource control (RRC) connection request message. Alternatively, the UE may start a timer for the access category, if the access attempt is barred for the access category.

According to an embodiment of the present invention, one or more access categories can be mapped to a particular barring information, and then a UE may perform access barring mechanisms based on the barring information mapped to at least one access category. Therefore, compared to the case where barring information is defined for each of the access categories, signaling of a network for transmission of the barring information can be decreased.

Figure 16:
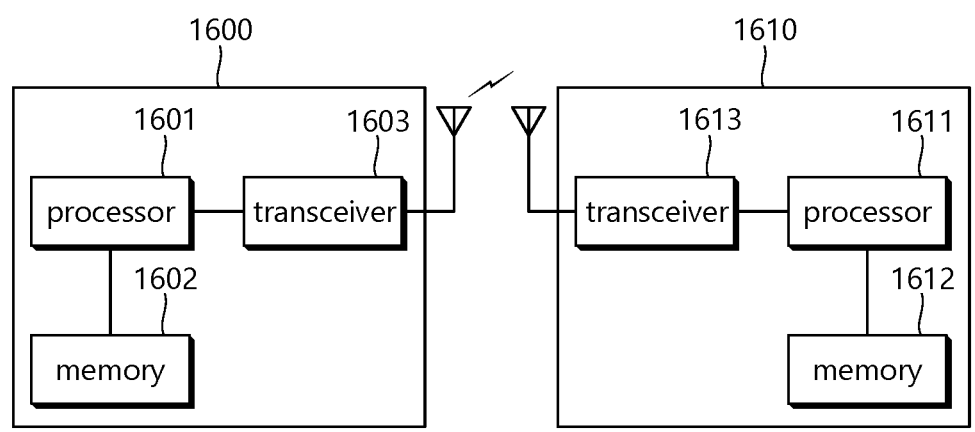
FIG. 16 is a block diagram illustrating a wireless communication system according to the embodiment of the present invention.

FIG. 16 is a block diagram illustrating a wireless communication system according to the embodiment of the present invention.

A BS 1600 includes a processor 1601, a memory 1602 and a transceiver 1603. The memory 1602 is connected to the processor 1601, and stores various information for driving the processor 1601. The transceiver 1603 is connected to the processor 1601, and transmits and/or receives radio signals. The processor 1601 implements proposed functions, processes and/or methods. In the above embodiment, an operation of the base station may be implemented by the processor 1601.

A UE 1610 includes a processor 1611, a memory 1612 and a transceiver 1613. The memory 1612 is connected to the processor 1611, and stores various information for driving the processor 1611. The transceiver 1613 is connected to the processor 1611, and transmits and/or receives radio signals. The processor 1611 implements proposed functions, processes and/or methods. In the above embodiment, an operation of the user equipment may be implemented by the processor 1611.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of performing, by a user equipment (UE), an access barring check in a wireless communication system, the method comprising:

receiving a first list that relates a plurality of access categories with a plurality of indices, wherein each of the plurality of indices is related to one or more access categories among the plurality of access categories;

receiving a second list comprising a plurality of barring information, wherein each of the plurality of barring information is indexed by each of the plurality of indices, wherein each of the plurality of barring information comprises a barring factor and a barring time;

determining, by a non-access stratum (NAS) layer of the UE, a first access category for an access attempt to a cell, wherein the first access category is informed by the NAS layer of the UE to a radio resource control (RRC) layer of the UE;

based on the first access category that the NAS layer of the UE informs to the RRC layer of the UE, selecting, by the RRC layer of the UE, among the plurality of indices from the first list, a first index that is related to the first access category;

after selecting the first index that is related to the first access category, selecting, by the RRC layer of the UE, among the plurality of barring information from the second list, first barring information that is related to the first index related to the first access category;

performing, by the RRC layer of the UE, the access barring check for the first access category, based on a first barring factor and a first barring time comprised in the first barring information; and performing uplink transmission based on performing the access barring check.

2. The method of claim 1, wherein receiving the second list comprises receiving the second list from a network.

3. The method of claim 2, wherein receiving the second list from the network comprises receiving the second list from the network via system information.

4. The method of claim 1, wherein performing the access barring check for the first access category comprises:
performing the access barring check based on whether the first access category is included in one or more access categories.

5. The method of claim 1, wherein performing the access barring check for the first access category based on the first barring information comprises:
determining whether a random value between 0 and 1 is less than the barring factor determined from the first barring information.

6. The method of claim 1, further comprising:
based on the access barring check indicating that an access attempt for the first access category is barred, waiting an amount of time related to the barring time determined from the first barring information before a new access attempt is performed for the first access category.

7. The method of claim 1, further comprising:
starting a timer for the first access category based on the access barring check indicating that an access attempt is barred for the first access category.

8. The method of claim 1, wherein the plurality of access categories in the first list is configured to be a subset of a total number of access categories.

9. The method of claim 1, wherein the uplink transmission comprises transmission of a radio resource control (RRC) connection request message.

10. A user equipment (UE) configured to perform an access barring check in a wireless communication system, the UE comprising:
a transceiver;
at least one processor; and
at least one computer memory operably connectable to the at least one processor and storing instructions that, when executed, cause the at least one processor to perform operations comprising:
receiving, through the transceiver, a first list that relates a plurality of access categories with a plurality of indices, wherein each of the plurality of indices is related to one or more access categories among the plurality of access categories;

receiving, through the transceiver, a second list comprising a plurality of barring information, wherein each of the plurality of barring information is indexed by each of the plurality of indices, wherein each of the plurality of barring information comprises a barring factor and a barring time;

determining, by a non-access stratum (NAS) layer of the UE, a first access category for an access attempt to a cell, wherein the first access category is informed by the NAS layer of the UE to a radio resource control (RRC) layer of the UE, based on the first access category that the NAS layer of the UE informs to the RRC layer of the UE, selecting, by the RRC layer of the UE, among the plurality of indices from the first list, a first index that is related to the first access category;

after selecting the first index that is related to the first access category, selecting, by the RRC layer of the UE, among the plurality of barring information from the second list, first barring information that is related to the first index related to the first access category;

performing, by the RRC layer of the UE, the access barring check for the first access category, based on a first barring factor and a first barring time comprised in the first barring information; and performing uplink transmission, through the transceiver, based on performing the access barring check.

11. The UE of claim 10, wherein receiving the second list comprises receiving the second list from a network.

12. The UE of claim 11, wherein receiving the second list from the network comprises receiving the second list from the network via system information.

13. The UE of claim 10, wherein performing the access barring check for the first access category comprises:
performing the access barring check based on whether the first access category is included in one or more access categories.

14. The UE of claim 10, wherein performing the access barring check for the first access category based on the first barring information comprises:
determining whether a random value between 0 and 1 is less than the barring factor determined from the first barring information.

15. The UE of claim 10, wherein the operations further comprise:
based on the access barring check indicating that an access attempt for the first access category is barred, waiting an amount of time related to the barring time determined from the first barring information before a new access attempt is performed for the first access category.

16. The UE of claim 10, wherein the operations further comprise:
starting a timer for the first access category based on the access barring check indicating that an access attempt is barred for the first access category.

17. The UE of claim 10, wherein the plurality of access categories in the first list is configured to be a subset of a total number of access categories.

18. The UE of claim 10, wherein the uplink transmission comprises transmission of a radio resource control (RRC) connection request message.

* * * * *